March 6, 1956 — H. C. WENDT — 2,737,054
GYRO PICK-OFF
Filed Jan. 13, 1953
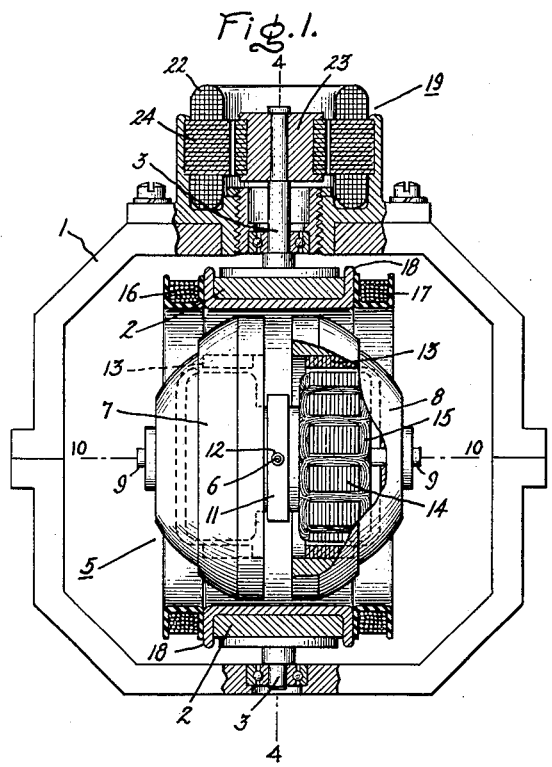
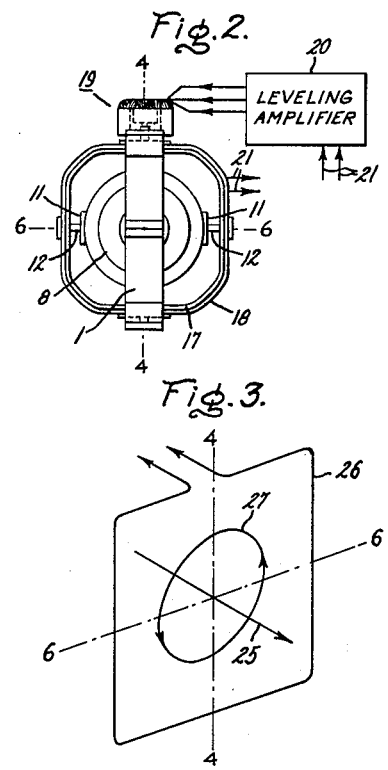
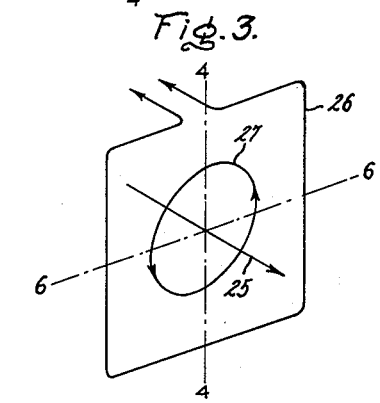
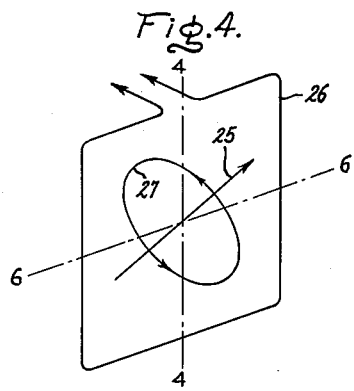
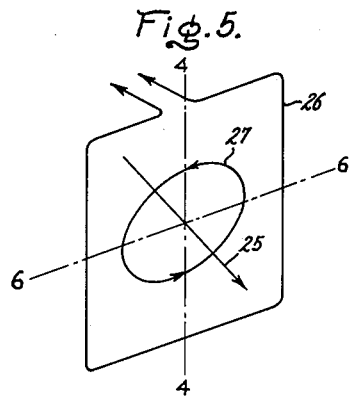
Inventor:
Harry C. Wendt,
by Richard E. Hosley
His Attorney.

United States Patent Office 2,737,054
Patented Mar. 6, 1956

2,737,054

GYRO PICK-OFF

Harry C. Wendt, Saugus, Mass., assignor to General Electric Company, a corporation of New York Application January 13, 1953, Serial No. 331,096

10 Claims. (Cl. 74—5.47)

The present invention relates to gyroscopes, and, more particularly, to electrical control arrangements responsive to deviations from perpendicularity of the spin axis and major axis of gyroscopes.

In the conventional three axis gyroscope, wherein the spin axis of the gyro rotor is normal to the minor or rotor support axis and the minor axis is normal to the major or main gimbal support axis, it is often necessary to utilize an electrical pick-off device along the minor gyro axis to detect and translate into characteristic electrical signals the angular orientations of the spin axis in relation to the main gimbal and major gyro axes. Such pick-off devices ordinarily comprise a rotor and stator assembly, at least the stator of which must be electrically coupled with energizing and output leads, with the stator mounted either on the main gimbal or on the rotor support and the rotor mounted on the other of these for relative angular movement. The output of the pick-off is employed to excite an amplifier and major axis levelling torque motor, in the example of a directional gyroscope, and to excite an amplifier and major axis erection torque motor in a gyro vertical installation. In either type of gyroscope, the magnetic materials in the conventional pick-off are productive of undesired torques, about the minor axis, which occasion gyro precession about the major gyro axis and create objectionable errors. Those pick-offs which employ wound rotors as well as wound stators further necessitate additional electrical coupling about the minor axis, which coupling also introduces error-producing torques. The rigid specifications for accuracy in modern high-precision gyro instruments do not permit errors having origins in these sources to be of magnitudes heretofore experienced. Additionally, it is an obvious, and very decided, constructional advantage to remove the minor axis pick-off stator and rotor assembly from its customary position along the minor axis where it occupies considerable space and complicates assembly.

The present invention utilizes the leakage flux of an electrical gyroscope rotor motor to link and induce characteristic electrical signals in windings mounted on the main gimbal of the gyroscope. The main gimbal windings thus constitute the sole addition to the other usual gyro structure which must be made to secure a control or pick-off signal responsive to orientations of the spin axis in relation to the main gimbal and major gyro axis. A pick-off rotor or exciting means function is served by the gyro motor itself, and no separate pick-off excitation signal is required. Further, as distinguished from prior control initiators or pick-offs in similar applications, locking torques, complicated windings and assemblies, and close tolerances are avoided. Shielding from the motor leakage flux is also eliminated, since it is this very flux which induces the desired control signals.

Accordingly, it is one object of the present invention to provide a novel and improved electrical control initiator for gyroscopes.

Further, it is an object to provide novel gyroscope pick-off arrangement wherein the gyro rotor motor serves as the pick-off rotor.

An additional object is to provide gyroscopic apparatus having a simple and accurate gyro pick-off excited and controlled by gyro motor leakage flux.

By way of a summary account of one aspect of the invention, there is provided a pair of substantially annular coils mounted in planes parallel with the main gimbal and major gyro axis of a three-axis directional gyroscope. Leakage flux from the stator windings of an alternating current gyro rotor motor pivotally supported in the main gimbal links the coils mounted on the main gimbal to induce electrical output signals characterizing the angular relationship between the coils and rotor spin axis with which the motor flux pattern is concentric. The output signals from these coils are applied to a phase-sensitive levelling amplifier which excites a major axis torque motor to apply levelling torques restoring perpendicularity between the gyro spin axis and the plane of the main gimbal and output coils.

Although the features of this invention which are believed to be novel are set forth in the appended claims, greater detail of the invention itself and the further objects and advantages thereof may be readily comprehended by reference to the following description taken in connection with the accompanying drawing, wherein:

Fig. 1 illustrates a three-axis gyroscope, with portions in section, embodying teachings of the present invention;

Fig. 2 depicts another view of the gyroscope of Fig. 1 and its association with a phase-sensitive amplifier; and Figs. 3 through 5 are schematic diagrams representing the relationships between pick-off output coils and gyro motor leakage flux for selected positions of the spin axis of a gyroscope such as that of Figs. 1 and 2.

Referring to the gyroscopic apparatus of Fig. 1 it will be noted that the outer frame or gimbal 1, which may be rigidly fastened to an aircraft, supports a main gimbal 2 on trunnions 3 for full freedom of relative rotational movement about the major gyro axis 4—4. Main gimbal 2 in turn supports a rotor structure 5 for pivotal movement about a minor axis 6, viewed on end, which is normal to the major axis 4—4. The rotor structure 5 has been illustrated as that disclosed in my copending application Serial No. 325,577, filed December 12, 1952, for "Symmetrical Gyroscope," assigned to the same assignee as that of the present application, inasmuch as the unique design of the symmetrical rotor structure and the absence of an inner gimbal are particularly advantageous in the subject control initiator arrangement. A pair of symmetrical rotor halves, 7 and 8, are rotatable on a shaft 9 about the spin axis 10—10, the rotor shaft being supported in bearings carried by the bar-shaped pivotal support member 11 which is positioned intermediate the rotor halves and has projecting therefrom the minor axis trunnions, such as trunnion 12. Rotor halves 7 and 8 are substantially cup-shaped, and carry annular hysteresis motor rotor members 13 on their interiors to cooperate with the hysteresis motor stator core laminations 14 and windings 15 supported by the bar-shaped member 11. As is well-known, the rapidly rotating alternating magnetic fields established by the motor stator interact with the hysteresis rotor material to establish torques which spin the annular members 13, and their attached rotor halves 7 and 8, at the very great speed necessary for the rotor halves to develop the required gyro inertia about the spin axis.

Rather than through the customary practice of mounting a pick-off stator on one of the rotor structure and gimbal and a pick-off rotor on the other to secure an output of electrical signals characterizing the relationship between the spin axis and main gimbal, the signals are obtained in the present invention through the linking of leakage flux from the gyro rotor motor stators with an inductive means such as the substantially annular output coils 16 and 17 carried by the main gimbal bracket 13 and parallel with the major axis 4—4. The voltages induced in these coils, or in a winding comprised of a single coil, by the motor leakage flux are of phases and amplitudes which represent the senses and extents of angular displacements of the spin axis about the major axis from a neutral position. Because the stator windings are concentric with the spin axis and the leakage fluxes are thus in planes perpendicular to the spin axis, the neutral position of the spin axis, the position at which no output voltage is generated in the annularly wound output coils 16 and 17, is that at which the spin axis is perpendicular to the planes of the output coils. Increased deviations of the spin axis from a perpendicular relationship with the coils results in increased cutting of leakage flux by the output coils and increased generation of output voltages therein. Further, deviations in opposite angular directions from the neutral position result in output voltages having opposite phases whereby the phase and amplitude of any output voltage completely characterizes the particular deviation then experienced.

Slip rings, not illustrated, but well known to those acquainted with gyro construction, may be employed to couple the signals from the control initiator, or pickoff, output winding with associated equipment which is responsive to these signals. In the example of a directional gyroscope, the output voltages are applied to a phase-sensitive rectifier-amplifier unit which in turn actuates a torque motor to exert torques about the major gyro axis and thereby precess the rotor structure to the position wherein the spin axis is perpendicular to the planes of the output windings. These planes are parallel to the major axis and the main gimbal, such that the spin axis is levelled and cannot drift about the minor gyro axis. In Fig. 2, the gyroscope of Fig. 1 is illustrated in a side view, corresponding elements being identified by the same reference characters, and the major axis torque motor 19 is shown to be excited by the output of a levelling amplifier 20. Leads 21 connect the serially-coupled outputs of coils 16 and 17 with the input of amplifier 20, preferably through slip rings about major axis 4—4. Torque motor 19, which appears in greater detail in Fig. 1 is likewise phase-sensitive. That is, when signals of one phase relationship are applied to stator windings 22 in response to the excitation of amplifier 20 by output coil signals of one phase, the torque motor rotor 23 is urged in one angular direction by fluxes from stator core 24, and is urged in the opposite angular direction when signals of the opposite phase applied to amplifier 20 produce an amplifier output having another phase relationship. Torque motor rotor 23 is attached to the major axis trunnion 3 and its stator winding and core are affixed to the gyro outer frame 1, whereby motor forces between the rotor and stator are effective to precess the gyro rotor structure about the minor axis 6—6.

Figs. 3, 4 and 5 represent schematically the pick-off winding, gyro spin axis, and gyro motor leakage flux relationships for three important gyro conditions. The spin axis 25 in Fig. 3 is shown to be normal to the plane of output windings 26, whereupon the circulating leakage flux 27 is parallel with the winding and induces no output voltage therein. This position of the spin axis, perpendicular to the major axis 4—4, is a preferred one, and the absence of output voltage from winding 26 is a desired condition because the levelling amplifier is unexcited and produces no output which would actuate the major axis torque motor and cause the spin axis to be precessed to another position. Upon displacement of the spin axis 25 in an upward direction, as depicted in Fig. 4, the leakage flux 27 cuts winding 26 and induces an output voltage of one phase therein. Displacement of the spin axis in the opposite direction, as illustrated in Fig. 5, results in cutting of winding 26 by leakage flux 27 in the opposite sense and the inducing of an output voltage of an opposite phase. Greater angular displacements of the spin axis occasion greater amplitudes of output voltage from the winding until the displacements are 90° from the neutral position. The phase and amplitude characteristics of the output winding signals thus define the angular relationship between the spin axis and major gyro axis or plane of the main gimbal and output winding.

Phase adjustments of the output winding signals, to bring the signal voltages into a desired relationship with a reference voltage, may be important when these signal voltages are fed to a phase-sensitive amplifier. While it has been the practice to employ electrical phase shifting networks to accomplish this result in the case of conventional control initiators, the required phase adjustment may be simply and accurately made in the subject device by angularly adjusting the gyro motor stator about the spin axis. The circulating leakage flux, which is fixed in phase relationship with the gyro motor stator, is shifted accordingly. Thus, in the gyroscope of Fig. 1, the assembly of stator cores 14 and windings 15 may first be angularly positioned about spin axis 10—10 to provide the proper phase of output signals from the winding comprised of coils 16 and 17, and may then be fixedly positioned in relation to the support bar 11. Compensation for the sum of all phase shifts between the output voltages and a reference voltage may be advantageously accomplished in this manner. Adjustments to make the electrical null or zero output condition of the output winding coincide with the perpendicular relation between the spin axis and major gyro axis may comprise tilting of the output coils slightly out of a parallel relationship with the major axis.

Although the illustrated embodiment of this invention has been described as that of a directional gyroscope, the same control initiator arrangement is equally advantageous in other embodiments, such as that of a gyro vertical or rate gyroscope. Detection of tilt about the minor axis of a gyro vertical with this pick-off provides control for remote attitude indicators, or autopilot apparatus, or for a gyro-erecting torque motor. By mounting the output winding on an independent gimbal which is pendulously suspended, the output signals are made gravity-responsive and may be employed to actuate a torque motor erecting the gyro vertical in accordance with departures of the spin axis from the vertical as defined by the pendulous gimbal and output winding. An output winding mounted on the outer frame of the gyroscope, parallel with the major gyro axis, provides output signals which characterize the angular displacements of the spin axis about the major axis. Thus, in a gyro vertical having a first output winding mounted on the main gimbal and a second output winding mounted on the outer frame, output signals may be obtained from the two windings to characterize both pitch and bank displacements of the supporting craft with reference to the gyro vertical spin axis. It should be apparent, therefore, that the instant invention may be embodied in gyroscopes wherein the output winding is mounted on the main gimbal, or on the outer frame of the gyro, as on an independently supported gimbal.

In those applications wherein the output winding is mounted on the main gimbal and substantially parallel with the major gyro axis, the winding may also be employed to carry direct current signals for the purpose of precessing the gyroscope about its major axis. This arrangement is particularly useful in connection with a slaved directional gyroscope, wherein lack of azimuthal correspondence between the gyro spin axis and a magnetic compass or flux valve indication is translated into direct current signals which energize a minor axis torque to precess the gyro about the major axis until the spin axis reaches the proper azimuth heading. When a winding mounted on the main gimbal is used to carry the direct current signals, and generate unidirectional fluxes parallel with the spin axis, the gyro rotor structure is provided with permanent magnets whose magnetic fields are normal to the fields created by the windings, whereby torques are developed about the minor gyro axis, due to the field interactions, and the gyroscope is precessed about the major axis. Such torque motors are not favored because their use necessitates the addition of main gimbal windings and extra slip rings and brushes about the major gyro axis. However, the present invention involves control initiator windings which may simultaneously serve as torque motor windings, simply by feeding the direct current torque motor signals to the alternating current pick-off output windings. Isolation of the direct current signals from the alternating current pick-off signals is readily accomplished, as with capacitors, and the only additional equipment required comprises small permanent magnets affixed to the rotor structure.

Though the symmetrical gyro rotor structure illustrated yields a greater intensity and more uniform motor leakage flux field, and therefore a better control initiator output signal, other rotor motor designs may be utilized successfully. Similarly, rotor motors other than those of the hysteresis type may be used advantageously, the only requirements being that a leakage flux from the gyro motor exciting windings and core be intercepted by the output winding and that the flux pattern be suitable to induce net output signals in the output windings.

It should be apparent that the specific embodiments of this invention shown and described herein are of a descriptive rather than a limiting nature, and that various changes, combinations, substitutions or modifications may be employed by those skilled in the art in accordance with these teachings and without departing in spirit or scope from this invention in its broader aspects.

What I claim as new and desire to secure by Letters Patent of the United States is:

1. Gyroscopic apparatus including a gyro rotor structure having alternating current motor means rotating a gyro rotor about a spin axis, said motor means producing a rotating alternating field coaxial with said spin axis, means supporting said rotor structure for pivotal movement about a support axis normal to said spin axis, and an inductive element mounted independently of said rotor structure such that it is coaxial with said spin axis when said spin axis is in a predetermined position, said inductive element having electrical output signals induced therein by leakage flux from said rotating alternating field of said motor means.

2. Gyroscopic apparatus, comprising a pivotally-supported alternating current gyro rotor motor producing a rotating alternating field coaxial with the spin axis of a gyro rotor, and annular electrical inductive means angularly movable in relation to said rotor motor and disposed to have electrical signals induced therein by leakage flux from said alternating field of said motor when said spin axis is inclined in relation to said inductive means, said signals characterizing the angular relationships between said motor and inductive means.

3. Gyroscopic apparatus including a gyro rotor structure having a gyro rotor rotatable about a spin axis, means pivotally supporting said rotor structure about a support axis normal to said spin axis, and an electrical control initiator for characterizing the angular relationships between said spin axis and support means in outputs of electrical signals, comprising an alternating current gyro motor stator in said rotor structure emitting a rotating alternating leakage flux magnetic field coaxial with said spin axis, and an annular electrical winding mounted on said support means in position to have zero output signals induced therein by said leakage flux field when said spin axis is normal to said winding and to have signals of different phases induced therein when said spin axis is inclined in relation to said winding in different directions from said normal relation to said winding.

4. In a gyroscopic apparatus, an electrical pick-off for detecting relative angular movement of a gyro spin axis from a predetermined position, comprising an alternating current electric motor stator producing a rotating leakage flux field symmetrical about said spin axis, a substantially planar inductive winding arrangement mounted for relative angular movement in relation to said motor and symmetrical in relation to the axis of said relative angular movement, said winding having electrical output signals induced therein by said rotating leakage flux field when said spin axis is displaced from a normal relation to said planar winding arrangement.

5. In a gyroscopic apparatus, an electrical pick-off for detecting relative angular movement of a gyro spin axis from a predetermined position, comprising an alternating current electric motor stator producing a rotating leakage flux field symmetrical about said spin axis, a substantially planar inductive winding arrangement mounted for relative angular movement in relation to said motor and symmetrical in relation to the axis of said relative angular movement, said winding arrangement being positioned to have zero net voltage induced therein when said spin axis is in said predetermined position and to have net alternating voltages of different phases induced therein by said rotating field when said spin axis is displaced in different angular directions from said predetermined position.

6. In a gyroscopic apparatus having a gyro rotor structure pivotally mounted in a supporting gimbal, an electrical pick-off arrangement producing signals characterizing the relative angular positions of said rotor structure and gimbal, comprising exciting means including an alternating current electric motor stator as part of said rotor structure producing a rotating leakage flux field symmetrical about the spin axis of said rotor structure, and substantially planar electrical output winding means supported by and parallel with said gimbal to have output signals induced therein by said leakage flux.

7. In a gyroscopic apparatus having an outer frame, a main gimbal pivotally mounted in said frame about a major axis, and a gyro rotor structure pivotally mounted in said main gimbal about a minor axis perpendicular to said major axis, a pick-off comprising an electric motor exciting winding means supported by said rotor structure and producing alternating magnetic flux symmetrical about and rotating in planes perpendicular to the spin axis of said rotor structure, and electrical output coil means supported by said main gimbal with turns thereof substantially parallel with said major axis, whereby rotating leakage flux from said motor winding means induces net alternating output signals in said output coil means when said spin axis departs from a perpendicular relation to said major axis.

8. In a gyroscopic apparatus as set forth in claim 7, the gyro rotor structure comprising a pair of symmetrical gyro rotors, a support member intermediate said rotors supporting said rotors for rotation about said spin axis, and gyro motor stator core means supported by support member, said exciting winding means being supported with said stator core means, whereby said rotating leakage flux from said winding means is substantially symmetrical about and in planes perpendicular to said spin axis.

9. Gyroscopic apparatus comprising an outer frame a main gimbal pivotally mounted in said frame about a major axis, a gyro rotor structure pivotally mounted in said main gimbal about a minor axis perpendicular to said major axis, said rotor structure including electric motor exciting winding means producing alternating magnetic flux substantially symmetrical about and rotating in planes perpendicular to the spin axis of said rotor structure, electrical output coil means supported by said main gimbal with turns thereof substantially parallel with said major axis, said coil means having output signals induced therein by rotating leakage flux from said exciting winding means of said rotor structure when said spin axis departs from a perpendicular relation to said turns, and electrical torque motor means for exerting torques about said major axis responsive to said output signals.

10. Directional gyroscope apparatus comprising an outer frame, a main gimbal pivotally mounted in said frame about a normally vertical major axis, a gyro rotor structure pivotally mounted in said main gimbal about a normally horizontal minor axis, said rotor structure including electric motor exciting winding means producing alternating magnetic flux rotating in planes substantially perpendicular to the normally horizontal spin axis of said rotor structure, electrical output coil means supported by said gimbal with turns parallel to said major axis and encircling said spin axis in its normally horizontal position, said coil means having output signals induced therein by rotating leakage flux from said exciting winding means of said rotor structure when said spin axis departs from a perpendicular relation to said turns, and levelling torque motor means responsive to said output signals precessing said rotor structure about said minor axis to restore perpendicularity between said spin axis and said turns of said coil means.

References Cited in the file of this patent

UNITED STATES PATENTS

| | | |
|---|---|---|
| 1,972,882 | Gilmor | Sept. 11, 1934 |
| 2,247,142 | Anscott et al. | June 24, 1941 |
| 2,328,744 | Roters | Sept. 7, 1943 |
| 2,562,690 | Becker | July 31, 1951 |
| 2,620,570 | Minas | Dec. 9, 1952 |
| 2,628,502 | Klein | Feb. 17, 1953 |

FOREIGN PATENTS

| | | |
|---|---|---|
| 971,418 | France | July 19, 1950 |